(12) United States Patent
Amemiya et al.

(10) Patent No.: US 8,520,690 B2
(45) Date of Patent: Aug. 27, 2013

(54) COMMUNICATION APPARATUS

(75) Inventors: Kouichirou Amemiya, Kawasaki (JP); Shinya Kano, Kawasaki (JP); Yasuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 12/689,534

(22) Filed: Jan. 19, 2010

(65) Prior Publication Data

US 2010/0142546 A1 Jun. 10, 2010

Related U.S. Application Data

(63) Continuation of application No. PCT/JP2007/064263, filed on Jul. 19, 2007.

(51) Int. Cl.
*H04L 12/26* (2006.01)

(52) U.S. Cl.
USPC .......................................................... 370/401

(58) Field of Classification Search
USPC .......................................................... 370/401
See application file for complete search history.

(56) References Cited

U.S. PATENT DOCUMENTS

| 6,201,810 | B1 * | 3/2001 | Masuda et al. | 370/395.32 |
| 6,473,408 | B1 * | 10/2002 | Rochberger et al. | 370/255 |
| 6,560,654 | B1 * | 5/2003 | Fedyk et al. | 709/239 |
| 2003/0217140 | A1 * | 11/2003 | Burbeck et al. | 709/224 |
| 2004/0081105 | A1 | 4/2004 | Shimazaki et al. | |
| 2011/0063992 | A1 * | 3/2011 | Weng et al. | 370/252 |

FOREIGN PATENT DOCUMENTS

| JP | 2004-129135 | 4/2004 |
| JP | 2006-246126 | 9/2006 |
| WO | 2005/032061 | 4/2005 |

OTHER PUBLICATIONS

International Search Report dated Aug. 14, 2007, from the corresponding International Application.
F. Ly, et al. "Definitions of Supplemental Managed Objects for ATM Interface" Request for Comments: 3606, Network Working Group, Nov. 2003, retrieved from http://www.ietf.org/rfc/rfc3606.txt on Jun. 22, 2007.
K. Kompella, et al. "Routing Extensions in Support of Generalized Multi-Protocol Label Switching (GMPLS)" Network Working Group, Request for Comments: 4202, Oct. 2005, retrieved from http://www.ietf.org/rfc/rfc4202.txt on Jun. 22, 2007.
Dimitri Papadimitriou. "OSPFv2 Routing Protocols Extensions for ASON Routing, draft-ietf-ccamp-gmpls-ason-routing-ospf-02.txt" Network Working Group, Internet Draft, Oct. 2006, retrieved from http://rfc.netvolante.jp/internet-drafts/draft-ietf-ccamp-gmpls-ason-routing-ospf-02.txt on Jun. 22, 2007.

* cited by examiner

*Primary Examiner* — Mark Rinehart
*Assistant Examiner* — Christopher R Crompton
(74) *Attorney, Agent, or Firm* — Katten Muchin Rosenman LLP

(57) ABSTRACT

A communication apparatus stores therein link information indicating a network connection status of an entire hierarchical network, collects link information indicating a network connection status in its own area in predetermined cycles, and transmits the collected link information to another area assigned a level different from a level assigned to its own area. When receiving link information from another area assigned a different level, the communication apparatus determines whether the received link information is new link information newer than link information stored in a predetermined storage unit; when it is determined that the received link information is new link-information, the communication apparatus stores the new link information into the predetermined storage unit and advertises it in its own area; by contrast, when it is determined that the received link information is not new link-information, the communication apparatus discards the received link information without storing and advertising.

4 Claims, 12 Drawing Sheets

| LSA HEADER | | | | TLVs | |
|---|---|---|---|---|---|
| ADVERTISING ROUTER ID | LSA ID | LS AGE | LS SEQUENCE NUMBER | LOCAL NODE ID | REMOTE NODE ID |
| F | 1 | 100 | 15 | F | H |
| G | 1 | 111 | 10 | G | H |
| ... | ... | ... | ... | ... | ... |

COMMUNICATION APPARATUS

CROSS-REFERENCE TO RELATED APPLICATION(S)

This application is a continuation of International Application No. PCT/JP2007/064263, filed on Jul. 19, 2007, the entire contents of which are incorporated herein by reference.

FIELD

The embodiments discussed herein are directed to a communication apparatus that controls communication between an own area to which the communication apparatus belongs and to which a level is assigned and another area to which a different level from the level of the own area is assigned, in a hierarchical network including a plurality of areas to which levels are assigned.

BACKGROUND

Internet Engineering Task Force (IETF) is an organization which sets standards of Internet-related technologies. The IETF formally issues documents to lay open various technologies. One of them is functional enhancement of a routing technique using Multi-Protocol Label Switching (MPLS), which is a packet-transfer technique based on label switching (see "RFC 3606", [online], Internet <http://www.ietf.org/rfc/rfc4202.txt> searched on Jun. 22, 2007; "RFC 4202", [online], Internet <http://www.ietf.org/rfc/rfc3606. txt> searched on Jun. 22, 2007; and "draft-ietf-ccamp-gmpls-routing-ospf-02", [online], Internet <http://rfc.netvolante.jp/internet-drafts/draft-ietf-ccamp-gmpls-ason-routing-ospf-02.txt> searched on Jun. 22, 2007).

MPLS performs distribution and collection of link information (topology information) that indicates a network connection status used by a label switch network according to Open Shortest Path First (OSPF), and collects link connection information between nodes in the network.

Specifically, each node advertises information about a link whose starting point is the own node. Each node exchanges the information about the link with each of the other nodes, thereby transmitting link information to all nodes in the network. As a result, the all nodes in the network grasp link connection information among the all nodes in the network.

For example, a representative routing controller (hereinafter, "representative RC") that transmits and receives link information is provided in each routing area in a hierarchical network including leveled routing areas. When receiving link information through feed-up of transmitting link information from a lower level to an upper level, or feed-down of transmitting link information from an upper level to a lower level, the representative RC advertises the received link information to another RC in a routing area on the same routing level. In this way, each node in each routing area grasps link information of the entire network.

However, the conventional technology described above has a problem that there is a time during which link information is not advertised, and consistency of the link information may not be maintained. Specifically, when a representative RC stalls its function due to a failure, a Link-State Advertisement (link LSA) that is held by the representative RC and indicates an advertiser and a link connection status remains in its routing area, and a representative RC in charge of feed-up or feed-down is not replaced, resulting in an absence of such representative RC in the routing area, and link information is not advertised for a certain period of time.

SUMMARY

According to an aspect of an embodiment of the invention, an apparatus for controlling communication between an own area, to which the apparatus belongs and to which a level is assigned, and another area, to which a different level from the level of the own area is assigned, in a hierarchical network including areas to which levels are assigned, the apparatus includes: a link-information storage unit that stores therein link information indicating a network connection status across the hierarchical network; a link-information transmitting unit that transmits collected link information of the own area indicating a network connection status in the own area to another area assigned a different level from the level assigned to the own area, the collected link information being collected in predetermined cycles; a link-information determining unit that determines, when receiving link information from another area assigned the different level, whether received link information is new link information that is newer than link information stored by the link-information storage unit; and a link-information advertising unit that stores new link information into the link-information storage unit and advertises the new link information in the own area when the link-information determining unit determines that the received link information is the new link-information, and discards the received link information without storing and advertising the received link information, when the link-information determining unit determines that the received link information is not the new link-information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

[a] First Embodiment

Overview and Features of Communication Apparatus

Figure 1:
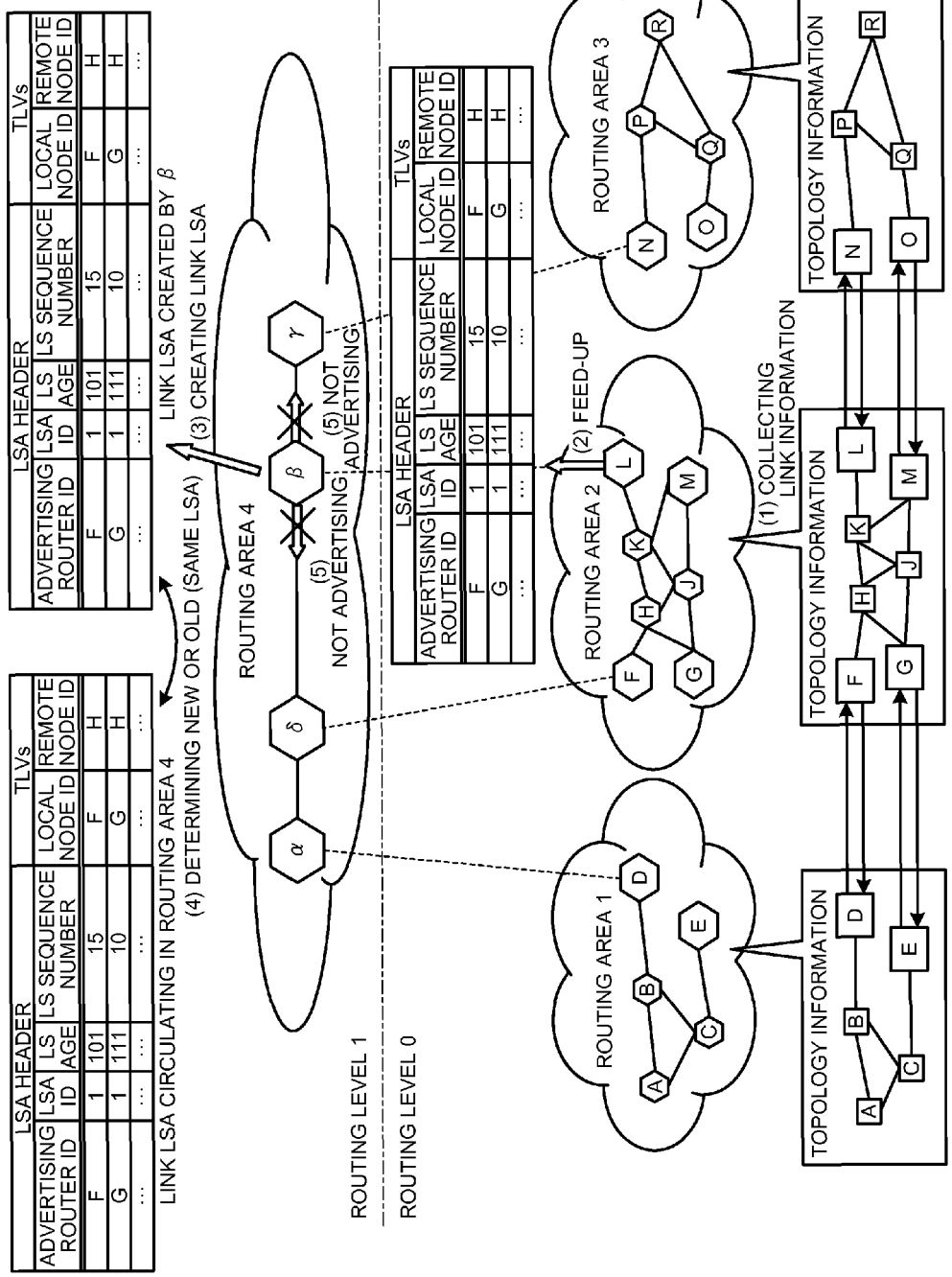
FIG. 1 is a schematic diagram of an overview and features of a system that includes a communication apparatus according to a first embodiment of the present invention.

An overview and features of a system that includes a communication apparatus according to a first embodiment is explained below. FIG. 1 is a schematic diagram of an overview and features of the system that includes the communication apparatus according to the first embodiment.

In the system as depicted in FIG. 1, a routing area 4 is assigned a routing level 1, and communication apparatuses α, δ, β, and γ are connected to the routing area 4; and similarly, a routing area 1, a routing area 2, and a routing area 3 are each assigned a routing level 0, communication apparatuses A to E are connected to the routing area 1, communication apparatuses F to H and communication apparatuses J to M are connected to the routing area 2, and communication apparatuses N to R are connected to the routing area 3. Each of the communication apparatuses holds link information of its own routing area. In other words, the system forms a hierarchical network that includes the routing area 4 on the routing level 1, and the routing areas 1 to 3 on the routing level 0.

A transmission of link information from each of the routing areas 1 to 3 on the routing level 0 that is a lower level in the hierarchy to the routing area 4 on the routing level 1 that is an upper level in the hierarchy is referred to as "feed-up", and a transmission of link information from an upper level to a lower level in the hierarchy is referred to as "feed-down". Moreover, according to the system, routing protocols vary between routing areas on the routing level 0 that is the lower level in the hierarchy, so that link information is not exchanged; therefore, link information is fed up to a routing area on the routing level 1 that is the upper level in the hierarchy, and then the link information is fed down to each routing area on the routing level 0 that is the lower level in the hierarchy. As a result, a routing controller in each routing area on the routing level 0 that is the lower level can grasp link information of the same level and link information of the upper level, and further grasp link information of the entire hierarchical network that includes the upper level and the lower level.

The communication apparatuses A to H and the communication apparatuses J to R that perform feed-up or feed-down described above are computer apparatuses each of which includes a routing function, for example, a router, a L3 switch, and the like, and are explained below in the first embodiment as routing controllers A to R (hereinafter, "RCs (A) to (R)"). Moreover, although the first embodiment is explained below by assuming that a destination apparatus of feed-up performed by the RC (L) is the RC (β), the present invention is not limited to the description. An apparatus receiving fed-up information can be, for example, the RC (γ), and is set by, for example, an administrator in advance.

For example, the system is provided with a plurality of representative RCs (the RC (L) and the RC (F)) that has a function of transmitting to the routing level 1 topology information that is collected link information of the routing area 2. The RC (L) collects link information and feeds it up to the RC (β). The RC (β) then transmits the fed up link information to the RC (δ) and the RC (γ), and the RC (δ) and the RC (γ) feeds down the link information to the RC (F) and the RC (N). The first embodiment is explained below about feed-up that the RC (L) transmits link information to the RC (β).

In such configuration, an overview is that the communication apparatus (the RC (L) and the RC (β)) controls communication between an own area, to which a level is assigned and to which the communication apparatus belongs, and another area, to which a different level from the level of the own area is assigned, in a hierarchical network including areas assigned with levels. Particularly, a main feature is that the communication apparatuses can maintain consistency of the link information without stagnating a circulation of the link information.

Explaining the main feature, the RC (L) stores therein link information that indicates a network connection status of the entire hierarchical network. As a specific example, the RC (L) stores therein link information about the entire hierarchical network including link information of the routing area 2, which is its own area; link information of the routing area 1 and the routing area 3, which are areas on the same level, obtained through the feed-up and the feed-down described above; and link information of a routing area on a different level. The stored link information is updated through feed-up and feed-down.

Under such state, the RC (L) collects link information of its own area that indicates a network connection status in its own area, in predetermined cycles (see (1) in FIG. 1). Specifically explaining, the RC (L) collects link information indicating a network connection status of the routing area 2, which is its own area, in predetermined cycles. For example, the RC (L) collects topology information that is link information indicating a network connection status of the routing area 2 on the routing level 0, when an RC (Z) is newly connected to the RC (M) in the routing area 2 and topology information of the routing area 2 is updated, or when a predetermined cycle elapses (for example, every 30 minutes).

Subsequently, the RC (L) transmits the collected link information of its own area to another area assigned a different level from the level assigned to its own area (see (2) in FIG. 1). Specifically explaining with reference to the example described above, the RC (L) transmits the collected link information of its own area to the routing area 4 assigned a different level from the level assigned to its own area. For example, the RC (L) converts the collected link information of the routing area 2 into the format of a Link-State Advertisement (link LSA), and feeds it up to the RC (β). The link LSA includes an "Advertising Router identification (ID)" that specifies an advertiser of a link, an "LSA ID" that specifies the link, an "LS Age" and an "LS Sequence Number" that are used for determining whether an LSA is new or old, and a "Local Node ID" and a "Remote Node ID" that indicate a terminal point of the link. When performing feed-up, although it is desirable from a point of view of extensibility that link information is converted into the link LSA format and abstracted, the link information can be directly fed up as it is, in order to simplify calculations of a redundant routes across a plurality of areas.

When receiving link information from another area assigned a different level, the RC (β) determines whether the received link information is newer than stored link information (see (3) and (4) in FIG. 1). Specifically, the RC (β) receives link information of the routing area 2 transmitted from the RC (L), and creates a link LSA indicating a network connected to an interface of the received link information, by directly giving the IDs described in the "Advertising Router ID" and the "LSA ID" of a link LSA of the received link information to the created link LSA. For example, the RC (β) creates a link LSA by directly using the values of an "Advertising Router ID=F" and an "LSA ID=1" of a link LSA of link information transmitted by the RC (L).

The RC (β) determines whether the received link information is the newest link information based on the values of the "LS Age" and "the "LS Sequence Number" by comparing the link LSA created from the link information received from the RC (L) with a stored link LSA circulating in the routing area 4. According to such determination, it is determined that a link LSA of which the processing time of the "LS Age" is newer and the "LS Sequence Number" is larger is a newer link LSA. For example, because the "LS Age=101" and the "LS Sequence Number=15" of the first row of the received link LSA, and the "LS Age=101" and the "LS Sequence Number=15" of the first row of a link LSA stored by a predetermined storage unit and circulating in the routing area 4 are the same values, the RC (β) determines that received link information (link LSA) is not new link information.

By contrast, when a received link LSA has the "LS Age=101" and the "LS Sequence Number=15", and a created link LSA has the "LS Age=100" and the "LS Sequence Number=14", the RC (β) determines that the received link information (link LSA) is new link information. The "LS Age" and the "LS Sequence Number" of a link LSA are a time from the establishment of a connection through a usual open shortest path first-traffic engineering (OSPF-TE) processing, and a sequence number to be assigned when database is refreshed, respectively. For example, the "LS Age" is turned to a time "101", which has elapsed since the RC (F) is connected to the RC (H), and the "LS Sequence Number" is turned to a sequence number "15", which is assigned when database is refreshed.

Subsequently, when it is determined that received link information is new link information, the RC (β) stores therein the new link information, and advertises the new link information in its own area; by contrast, when it is determined that received link information is not new link information, the RC (β) discards the link information without storing and advertising the link information (see (5) in FIG. 1).

Specifically explaining with reference to the example described above, when it is determined that received link information is the newest link information based on the values of the "LS Age" and the "LS Sequence Number" of a link LSA created from the received link information and a link LSA stored in a predetermined storage unit and circulating in the routing area 4, the RC (β) stores the newest link information in the predetermined storage unit, and advertises the newest link information to the RC (δ) and the RC (γ) in the routing area 4.

The RC (F) that is the representative RC of the routing area 2 also collects link information in a similar manner and transmits the collected link information to the RC (δ), and then the RC (δ) determines whether the received link information is new link information. Feed-up from the routing area 2 to the routing area 4 is explained above. Feed-up from the routing area 1 to the routing area 4, and feed-up from the routing area 3 to the routing area 4 are similarly executed. For example, the RC (D) on the routing level 1 collects link information of the routing area 1 and transmits the collected link information to the RC (α) in the routing area 4, and the RC (α) performs processing similar to the above described processing. The RC (N) on the routing level 3 collects link information of the routing area 3 and transmits the collected link information to the RC (γ) in the routing area 4, and the RC (γ) performs processing similar to the above described processing.

In this way, the communication apparatus according to the first embodiment (for example, the RC (L), the RC (F), the RC (β), and the RC (δ)) can transmit link information of its own routing area to the routing area 4 on an upper level, as a result, the communication apparatus can maintain consistency of the link information without stagnating a circulation of link information, as described above as the main feature.

Configuration of Communication Apparatus

Figure 2:
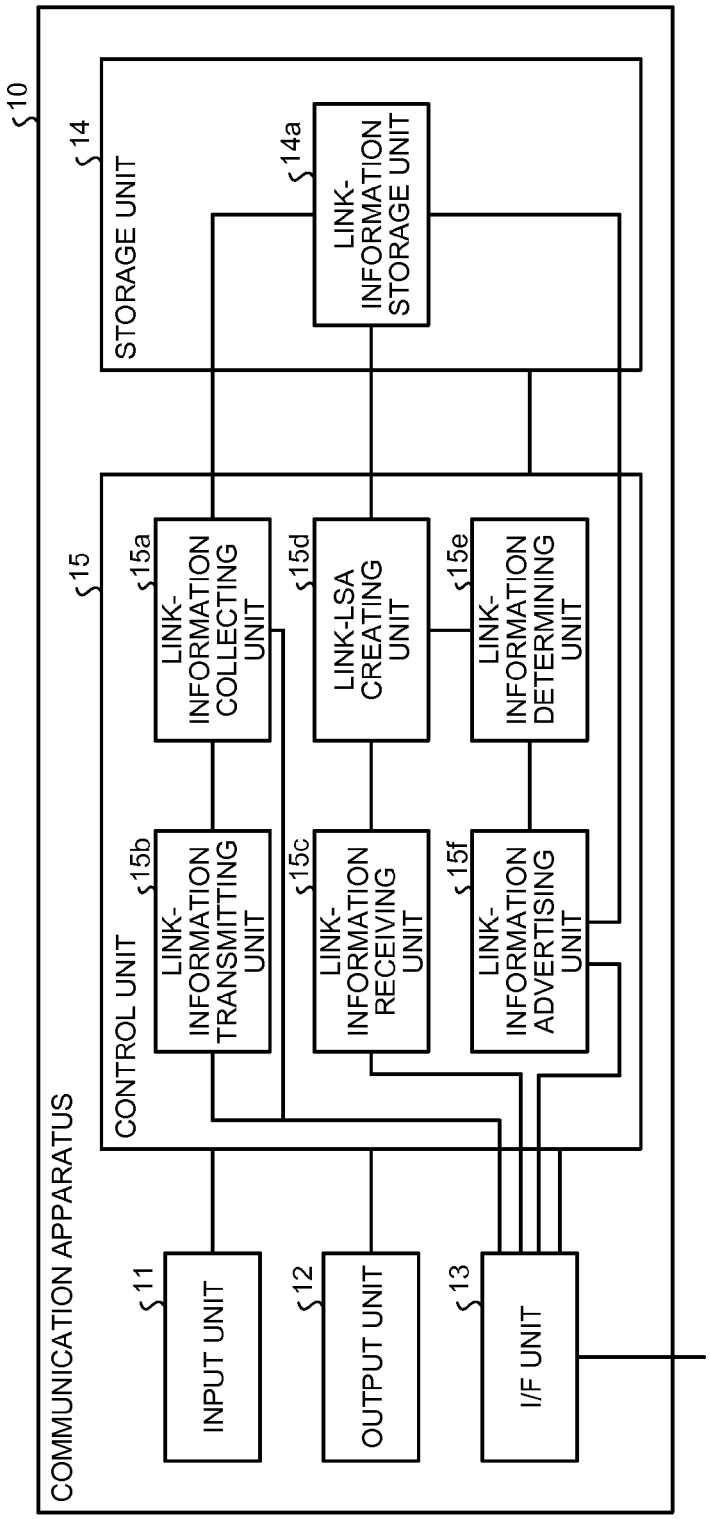
FIG. 2 is a functional block diagram of a configuration of the communication apparatus according to the first embodiment.

With reference to FIG. 2, a configuration of the communication apparatus according to the first embodiment is explained below with reference to FIG. 2. FIG. 2 is a functional block diagram of a configuration of the communication apparatus according to the first embodiment. As depicted in FIG. 2, a communication apparatus 10 includes an input unit 11, an output unit 12, an interface (I/F) unit 13, a storage unit 14, and a control unit 15. The RC (α), the RC (γ), the RC (β), and the RC (δ) in the routing area 4, the RC (D) in the routing area 1, the RC (F) in the routing area 2, the RC (N) in the routing area 3 have a similar function, in other words, the RC (α), the RC (γ), the RC (β), the RC (δ), the RC (D), the RC (F), and the RC (N) have the configuration depicted in FIG. 2; therefore, processing performed by each control unit depicted in FIG. 2 is explained below by using an example of processing performed between the RC (β) in the routing area 4 and the RC (L) in the routing area 2.

The input unit 11 receives input of various information. For example, when an administrator of the communication apparatus 10 determines an RC that takes charge of transmitting link information in each routing area, the input unit 11 receives input of the determination.

The output unit 12 includes a monitor (or a display device or a touch panel) and a speaker, and outputs various information. For example, the output unit 12 outputs and displays input received by the input unit 11 about an RC that takes charge of transmitting link information in each routing area.

The I/F unit 13 is connected to a network, and controls communications related to various information acquired via the network. For example, the I/F unit 13 of the RC (L) transmits a link LSA converted from link information to the RC (β). The I/F unit 13 of the RC (β) receives the link LSA from the RC (L), and advertises the received link LSA.

The storage unit 14 stores therein data needed for various processing performed by the control unit 15 and various processing results obtained by the control unit 15, and particularly includes a link-information storage unit 14a, which is closely relevant to the present invention.

Figures 3, 4:
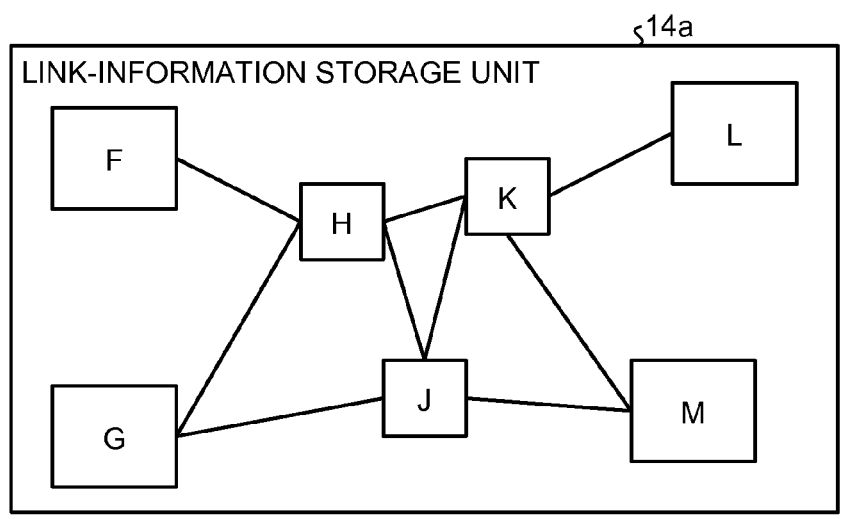
FIG. 3 is a schematic diagram of an example of a link-information storage unit according to the first embodiment.
FIG. 4 is a schematic diagram of an example of Link-State Advertisements (link LSAs) according to the first embodiment.

The link-information storage unit 14a stores therein link information received by the control unit 15, which will be described later. Specifically, the link-information storage unit 14a stores therein topology information that is link information of a routing area received by the control unit 15, for example, the link-information storage unit 14a stores therein topology information that is link information indicating that: the RC (F) is connected to the RC (H); similarly, the RC (G) is connected to the RC (H); the RC (H) is connected to the RC (F), the RC (G), the RC (J), and the RC (K); the RC (J) is connected to the RC (G), the RC (H), the RC (K), and the RC (M); the RC (K) is connected to the RC (H), the RC (J), and the RC (M); the RC (L) is connected to the RC (K); and the RC (M) is connected to the RC (J), and the RC (K). FIG. 3 is a schematic diagram of an example of stored topology information.

The control unit 15 includes an internal memory for storing therein a control program, programs that define various processing procedures, and predetermined data, particularly includes a link-information collecting unit 15a, a link-information transmitting unit 15b, a link-information receiving unit 15c, a link-LSA creating unit 15d, a link-information determining unit 15e, and a link-information advertising unit 15f, which are closely relevant to the present invention, and executes various processing with those units.

The link-information collecting unit 15a collects link information of its own area that indicates a network connection status in the own area in predetermined cycles. Specifically explaining with reference to the example described above, the link-information collecting unit 15a of the RC (L) collects topology information that is link information of the routing area 2 from another RC in the routing area 2 that is its own area, in predetermined cycles (for example, every 30 minutes), or when link information is updated. For example, when the RC (Z) is newly connected to the RC (M) in the routing area 2 so that the network connection status is updated, the RC (L) collects link information of the routing area 2.

The link-information transmitting unit 15b transmits link information of its own area collected by the link-information collecting unit 15a to another area assigned a different level from the level assigned to its own area. Specifically explaining with reference to the example described above, the link-information transmitting unit 15b of the RC (L) converts link information of the routing area 2 collected by the link-information collecting unit 15a into the link LSA format, and transmits it to the RC (β). As illustrated in FIG. 4, the transmitted link LSA includes an "Advertising Router ID" that identifies an advertiser of the link, an "LSA ID" that identifies the link, an "LS Age" and an "LS Sequence Number" used for performing new-old determination of the LSA, and a "Local Node ID" and a "Remote Node ID" indicating a terminal point of the link. The RC (L) transmits each row in one packet to the RC (β). When transmitting link information from the RC (L) to the RC (β), it is desirable from a point of view of extensibility that the link information is converted into the link LSA format and abstracted; however, the link information can be directly sent as it is, in order to simplify calculations of redundant routes across a plurality of areas.

The link-information receiving unit 15c receives link information from another area assigned a different level through the link-information transmitting unit 15b. Specifically explaining with reference to the example described above, the link-information receiving unit 15c of the RC (β) receives a link LSA as link information of the routing area 2 transmitted by the link-information transmitting unit 15b of the RC (L).

The link-LSA creating unit 15d creates a link LSA indicating a network connected to an interface of link information received by the link-information receiving unit 15c, by giving an identifier that uniquely identifies the received link information to the created link LSA.

Specifically explaining with reference to the example described above, the link-LSA creating unit 15d of the RC (β) creates a link LSA directly given with the IDs described in the "Advertising Router ID" and the "LSA ID" of a link LSA of link information of the routing area 2 received by the link-information receiving unit 15c, and indicating a network connected to an interface of the link information. For example, the link-LSA creating unit 15d of the RC (β) creates a link LSA by directly using the values of the "Advertising Router ID=F" and the "LSA ID=1" of the link LSA of the link information transmitted by the link-information transmitting unit 15b of the RC (L). The link-LSA creating unit 15d of the RC (β) then transmits the link LSA created from the received link information and a link LSA stored in the link-information storage unit 14a and circulating in the routing area 4, to the link-information determining unit 15e, which will be described later.

The "LS Age" and the "LS Sequence Number" of the link LSA are a time from the establishment of a connection through a usual open shortest path first-traffic engineering (OSPF-TE) processing, and a sequence number to be assigned when database is refreshed, respectively. For example, the "LS Age" is turned to a time "101", which has elapsed since the RC (F) is connected to the RC (H), and the "LS Sequence Number" is turned to a sequence number "15", which is assigned when database is refreshed.

When the link-information receiving unit 15c receives link information from another area assigned a different level, the link-information determining unit 15e determines whether the received link information is newer than link information stored in the link-information storage unit 14a. Specifically explaining with reference to the example described above, the link-information determining unit 15e of the RC (β) determines whether the received link information (link LSA) is the newest link information based on the values of the "LS Age" and the "LS Sequence Number", by comparing a link LSA created by the link-LSA creating unit 15d based on the link information received by the link information receiving unit 15c and a link LSA stored in the link-information storage unit 14a and circulating in the routing area 4. For example, the link-information determining unit 15e of the RC (β) determines that a link LSA of which the processing time of the "LS Age" is newer and the "LS Sequence Number" is larger is a newer link LSA.

When it is determined by the link-information determining unit 15e that received link information is new link information, the link-information advertising unit 15f stores the new link information in the link-information storage unit 14a, and advertises the new link information in its own area; by contrast, when it is determined that received link information is not new link information, the link-information advertising unit 15f discards the link information without storing and advertising the link information.

Specifically explaining with reference to the example described above, when the link-information determining unit 15e determines that the link information (link LSA) sent by the RC (β) is the newest link information, the link-information advertising unit 15f of the RC (β) stores the link information in the link-information storage unit 14a, and advertises (transmits) the link information to the RC (δ) and the RC (γ) in the routing area 4. By contrast, when the link-information determining unit 15e determines that the link information (link LSA) sent by the RC (β) is not the newest link information, the link-information advertising unit 15f of the RC (β) discards the link information without storing it in the link-information storage unit 14a, nor advertising it to the RC (δ) and the RC (γ) in the routing area 4.

Figure 5:
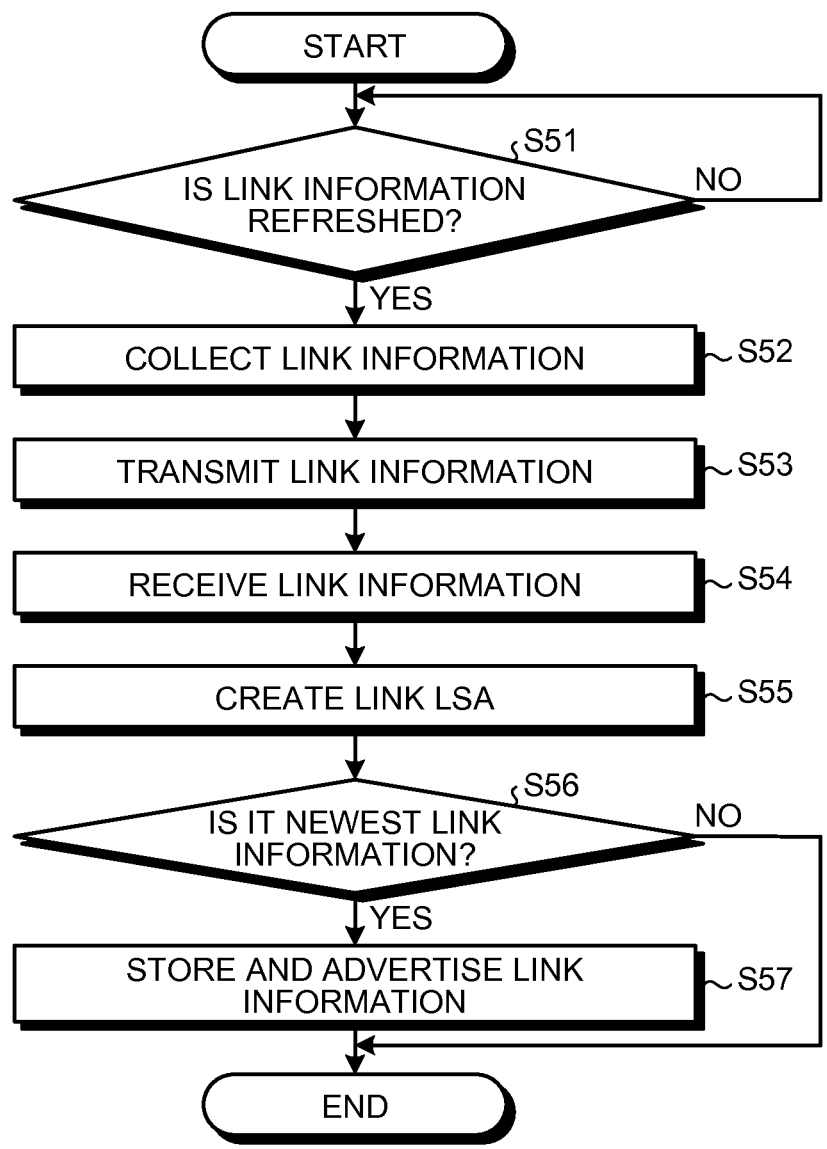
FIG. 5 is a flowchart of a link-information advertisement process performed by the system according to the first embodiment.

Flowchart of Link-Information Advertisement Process According to First Embodiment With reference to FIG. 5, a link-information advertisement process performed by the system according to the first embodiment is explained below. FIG. 5 is a flowchart of the link-information advertisement process performed by the system according to the first embodiment.

As depicted in FIG. 5, when the RC (L) feeds up link information to the RC (β), the link-information collecting unit 15a of the RC (L) collects topology information that is link information of the routing area 2 (Step S52) every 30 minutes or each time when link information is updated, i.e., when link information is refreshed (Yes at Step S51).

Subsequently, the link-information transmitting unit 15b of the RC (L) converts the link information of the routing area 2 collected by the link-information collecting unit 15a into the link LSA format, and transmits it to the RC (β) (Step S53).

The link-information receiving unit 15c of the RC (β) receives the link information of the routing area 2 transmitted by the link-information transmitting unit 15b of the RC (L) (Step S54).

After that, the link-LSA creating unit 15d of the RC (β) creates a link LSA indicating a network connected to an interface of the link information received by the link-information receiving unit 15c, by giving an identifier that uniquely identifies the received link information to the created link LSA (Step S55).

When the link-information receiving unit 15c of the RC (β) receives link information from another area assigned a different level, the link-information determining unit 15e of the RC (β) determines whether the received link information is newer than link information stored in the link-information storage unit 14a (Step S56).

If it is determined by the link-information determining unit 15e of the RC (β) that the received link information is new link information (Yes at Step S56), the link-information advertising unit 15f of the RC (β) stores the new link information in the link-information storage unit 14a, and advertises the new link information in its own area (Step S57); by contrast, if it is determined that the received link information is not new link information (No at Step S56), the link-information advertising unit 15f discards the received link information without storing and advertising.

Effects of First Embodiment

In this way, the communication apparatus stores therein link information indicating a network connection status of an entire hierarchical network; collects link information of its own area indicating a network connection status in its own area in predetermined cycles; transmits the collected link information of its own area to another area assigned a different level from the level assigned to its own area; upon receiving link information from another area assigned a different level, determines whether the received link information is newer link information than link information stored in a predetermined storage unit; and stores new link information in the predetermined storage unit and advertises the new link information in its own area if it is determined that the received link information is new link information; by contrast, discards the received link information without storing and advertising if it is determined that the received link information is not new link information; thereby being able to maintain consistency of the link information without stagnating a circulation of link information.

For example, the RC (L) in the routing area 2 is connected to the routing level 0, and the RC (β) in the routing area 4 is connected to the routing level 1. Under such configuration, the RC (L) transmits link information of the routing area 2 to the RC (β). The RC (β) then receives the link information transmitted by the RC (L), creates a link LSA of the received link information by giving it an identifier that uniquely identifies the received link information, and determines whether the received link information is the newest link information; and then if the link information subjected to the determination process is the newest link information, the RC (β) stores therein the link information and advertises it in its own area. By contrast, if the link information subjected to the determination process is not the newest link information, the RC (β) discards the link information without storing and advertising the link information, thereby being able to maintain accuracy of the link information by avoiding overlap of link information, and able to maintain consistency of the link information without stagnating link information circulation even when a failure occurs in the routing controller.

[b] Second Embodiment

Although the first embodiment is explained above about processing related to feed-up of transmitting link information from the RC (L) in the routing area 2 on a lower level to the RC (β) in the routing area 4 on an upper level, the present invention is not limited to the first embodiment, and feed-down process of transmitting link information from an upper level to a lower level can be performed.

Feed-Down Process According to Second Embodiment

Figure 6:
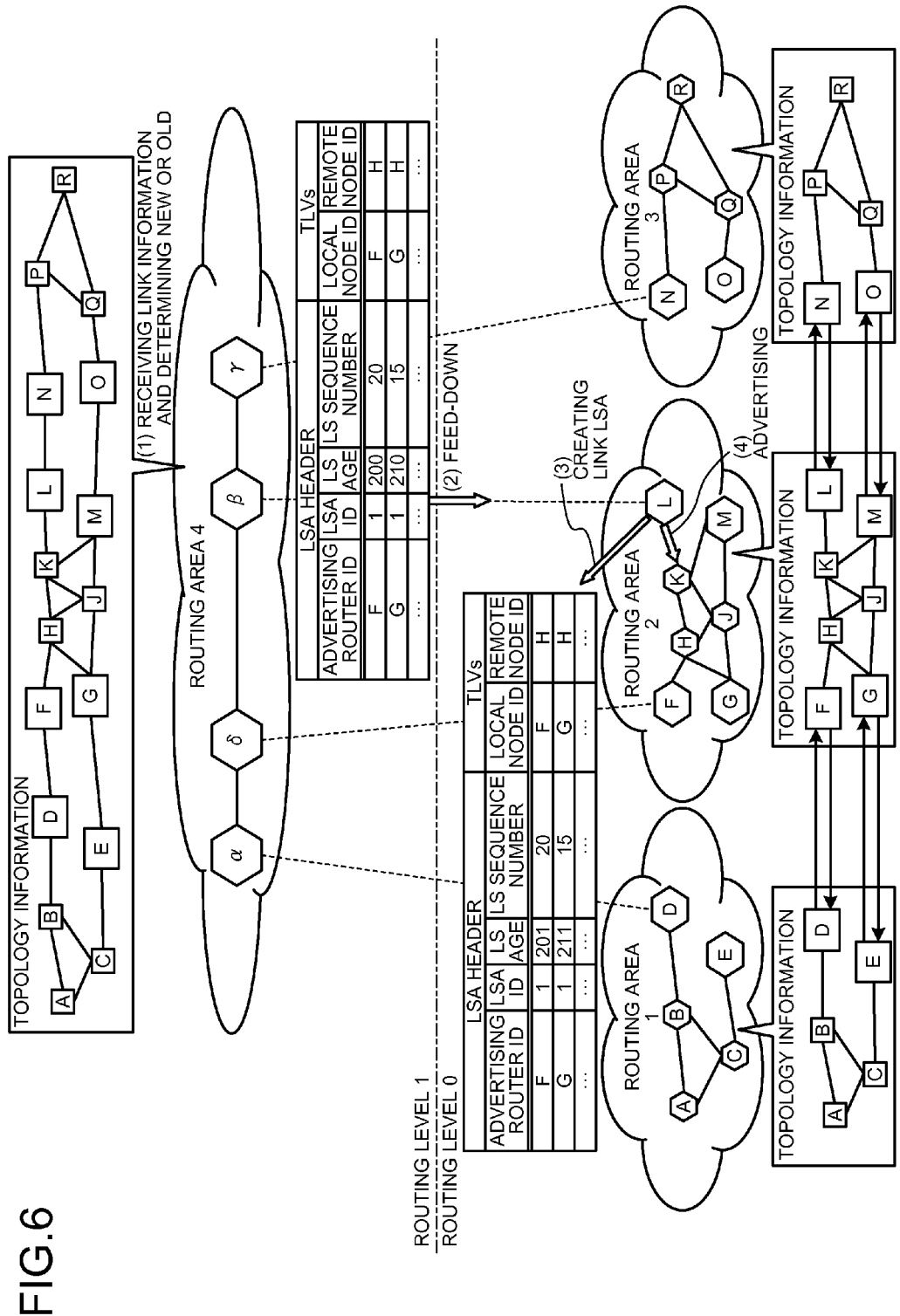
FIG. 6 is a schematic diagram for explaining a feed-down process performed by a system according to a second embodiment of the present invention.

A second embodiment of the present invention is explained below, with reference to FIG. 6, about processing related to feed-down of transmitting link information from the RC (β) in the routing area 4 on an upper level to the RC (L) in the routing area 2 on a lower level. FIG. 6 is a schematic diagram for explaining a feed-down process performed by a system according to the second embodiment. A functional configuration and each processing according to the second embodiment are similar to those according to the first embodiment, therefore, explanations of them are omitted.

As depicted in FIG. 6, when receiving link information from the own area assigned the same level, the RC (β) determines whether the received link information is newer link information than link information stored in the link-information storage unit 14a (see (1) in FIG. 6).

Specifically explaining, when receiving link information advertised by the RC (γ), which belongs to the same routing area 4, the RC (β) determines whether the received link information is the newest link information by comparing a link LSA created from the received link information and a stored link LSA circulating in the routing area 4. For example, when receiving link information advertised by the RC (γ), which belongs to the same routing area 4, the RC (β) refers to the values of the "LS Age" and the "LS Sequence Number" of a link LSA created from the received link information and stored link LSA circulating in the routing area 4. If the processing time of the "LS Age" and the "LS Sequence Number" of the received link LSA are larger than those of a stored link LSA circulating in the routing area 4, the RC (β) determines that the received link information is new link information; by contrast, if the processing time of the "LS Age" and the "LS Sequence Number" of a stored link LSA are larger, the RC (β) determines that the received link information is not new link information.

Subsequently, if it is determined that the received link information is new link information, the RC (β) stores the new link information in the link-information storage unit 14a, and transmits the new link information to another area on a lower level than its own area; by contrast, if it is determined that the received link information is not new link information, the RC (β) discards the received link information without storing and transmitting the received link information (see (2) in FIG. 6).

Specifically explaining with reference to the example described above, if it is determined that the received link information is new link information, the RC (β) stores the newest link information into the link-information storage unit 14a, and feeds down the link information to the RC (L) in the routing area 2 on the routing level 0, which is a lower level. By contrast, if it is determined that the received link information is not the newest link information, the RC (β) discards the received link information without storing and feeding down the received link information.

The RC (L) in the routing area 2 on the routing level 0 then creates a link LSA of the received link information (see (3) in FIG. 6), and advertises the created link LSA in its own area (see (4) in FIG. 6). Specifically explaining with reference to the example described above, when receiving link information transmitted by the RC (β), the RC (L) creates a link LSA of the received link information, and advertises the created link LSA in the routing area 2. The RC (L) that receives link information through feed-down from the RC (β) can omit new-old determination because the new-old determination is performed on an upper routing level.

Effects of Second Embodiment

In this way, according to the second embodiment, when receiving link information from the inside of the own area of the communication apparatus, the communication apparatus determines whether the received link information is newer link information than link information stored in a predetermined storage unit; and if it is determined that the received link information is new link information, the communication apparatus stores the new link information in the predetermined storage unit, and transmits the new link information to another area on a lower level than its own area; by contrast, if it is determined that the received link information is not new link information, the communication apparatus discards the received link information without storing and transmitting the received link information; accordingly, accuracy of the link information can be maintained by avoiding overlap of link information, and consistency of the link information can be maintained.

For example, the RC (β) and the RC (γ) in the routing area 4 are connected to the routing level 1, the RC (L) in the routing area 2 is connected to the routing level 0, and the RC (N) in the routing area 3 is connected to the routing level 0. Under such configuration, the RC (β) receives link information of the routing area 2 from the RC (L), and advertises it to the RC (γ). The RC (γ) then receives the advertised link information, creates a link LSA by giving it an identifier that uniquely identifies the link information, and determines whether the received link information is the newest. Subsequently, if the link information subjected to the determination process is the newest link information, the RC (γ) stores the newest link information in a predetermined storage unit, and transmits the newest link information to the RC (N) on the routing level 0; by contrast, if the link information subjected to the determination process is not the newest link information, the RC (γ) discards the link information without storing and transmitting the link information; accordingly, accuracy of the link information can be maintained by avoiding overlap of link information, and consistency of the link information can be maintained.

[c] Third Embodiment

According to an embodiment of the present invention, when a routing controller detects a function stall of another routing controller that is present in the same routing area and has the same function, the routing controller can feed up link information. In other words, among the RC (L) and the RC (F), both of which are routing controllers belonging to the routing area 2, when a function stall of the RC (F) is detected, the RC (L) can immediately transmit link information of the routing area 2 to the RC (β) in the routing area 4.

According to a third embodiment of the present invention described below, a configuration of a communication apparatus (the RC (L) and the RC (F)) according to the third embodiment is explained with reference to FIG. 7; selection of a feed-up RC and a backup feed-up RC by a system according to the third embodiment is explained with reference to FIG. 8; and a feed-up process performed by the system according to the third embodiment is explained with reference to FIG. 9. The feed-up RC mentioned above is an RC that performs feed-up representatively in a routing area, and the backup feed-up RC is an RC that performs feed-up as a backup of the feed-up RC when the feed-up RC stalls its function in the routing area due to a failure.

Configuration of Communication Apparatus According to Third Embodiment

Figure 7:
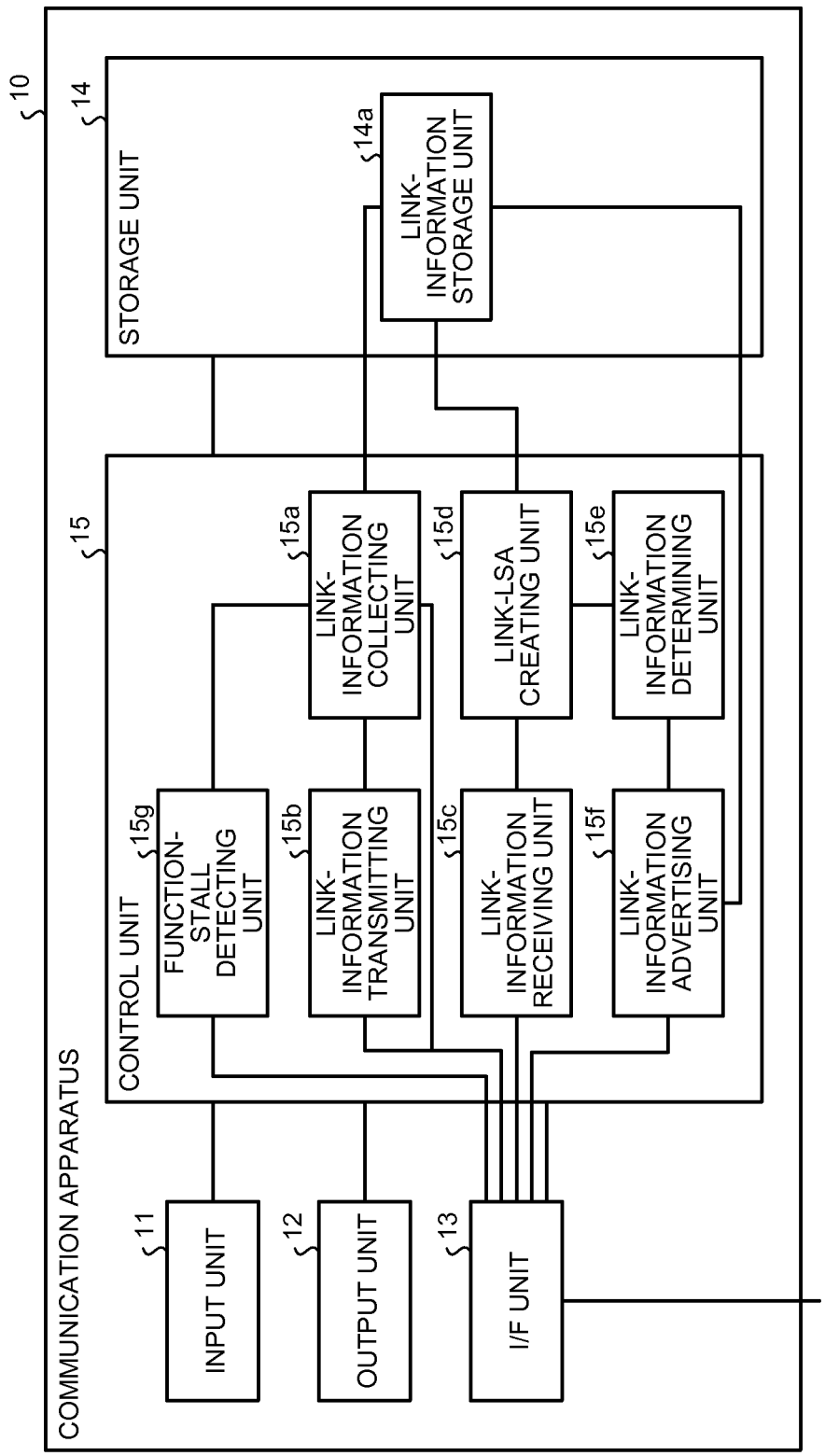
FIG. 7 is a functional block diagram of a configuration of a communication apparatus according to a third embodiment of the present invention.

FIG. 7 is a functional block diagram of a configuration of the communication apparatus (the RC (L) and the RC (F)) according to the third embodiment. As depicted in FIG. 7, the communication apparatus 10 includes the input unit 11, the output unit 12, the I/F unit 13, the storage unit 14, and the control unit 15.

The communication apparatus 10 according to the third embodiment includes the input unit 11, the output unit 12, the I/F unit 13, the storage unit 14, and the control unit 15. Among those units, the input unit 11, the output unit 12, the I/F unit 13, the link-information storage unit 14a of the storage unit 14, the link-information collecting unit 15a, the link-information transmitting unit 15b, the link-information receiving unit 15c, the link-LSA creating unit 15d, the link-information determining unit 15e, and the link-information advertising unit 15f of the control unit 15 have similar functions to those of the input unit 11, the output unit 12, the I/F unit 13, the link-information storage unit 14a of the storage unit 14, the link-information collecting unit 15a, the link-information transmitting unit 15b, the link-information receiving unit 15c, the link-LSA creating unit 15d, the link-information determining unit 15e, and the link-information advertising unit 15f of the control unit 15 explained in FIG. 2 of the first embodiment, therefore detailed explanations are omitted, and a function-stall detecting unit 15g that has a function different from the first embodiment is explained below.

The function-stall detecting unit 15g detects a function stall of a node that is present in its own area and has the same function as that of its own apparatus. As a specific example, when the RC (F) present in the same routing area 2 stalls its function due to some failure, and "OSPF hello" from the RC (F) does not reach the adjacent RC (H), the function-stall detecting unit 15g of the RC (L) detects that the RC (F) stalls its function. When all of "LS Ages" of link LSAs having the terminal point at the RC (F) are set to MaxAge, and it is determined that the RC (F) is down, the RC (L) then feeds up link information as a backup RC for the RC(F).

Selection of Feed-Up RC and Backup Feed-Up RC According to Third Embodiment

Selection of a feed-up RC and a backup feed-up RC according to the third embodiment is explained below with reference to FIG. 8. FIG. 8 is a schematic diagram for explaining selection of a feed-up RC and a backup feed-up RC according to the third embodiment. The third embodiment is explained below in a case depicted in FIG. 1 where link information is transmitted from the routing area 2 on the routing level 0 to the routing area 4 on the routing level 1; however, similar processing is performed by each routing area, such as the routing area 1 and the routing area 3. The third embodiment is explained below by assuming that large and small relation between values of "Advertising Router IDs" (specifically, for example, Internet protocol (IP) address) indicating advertisers of link information is "F>L>G".

Figure 8:
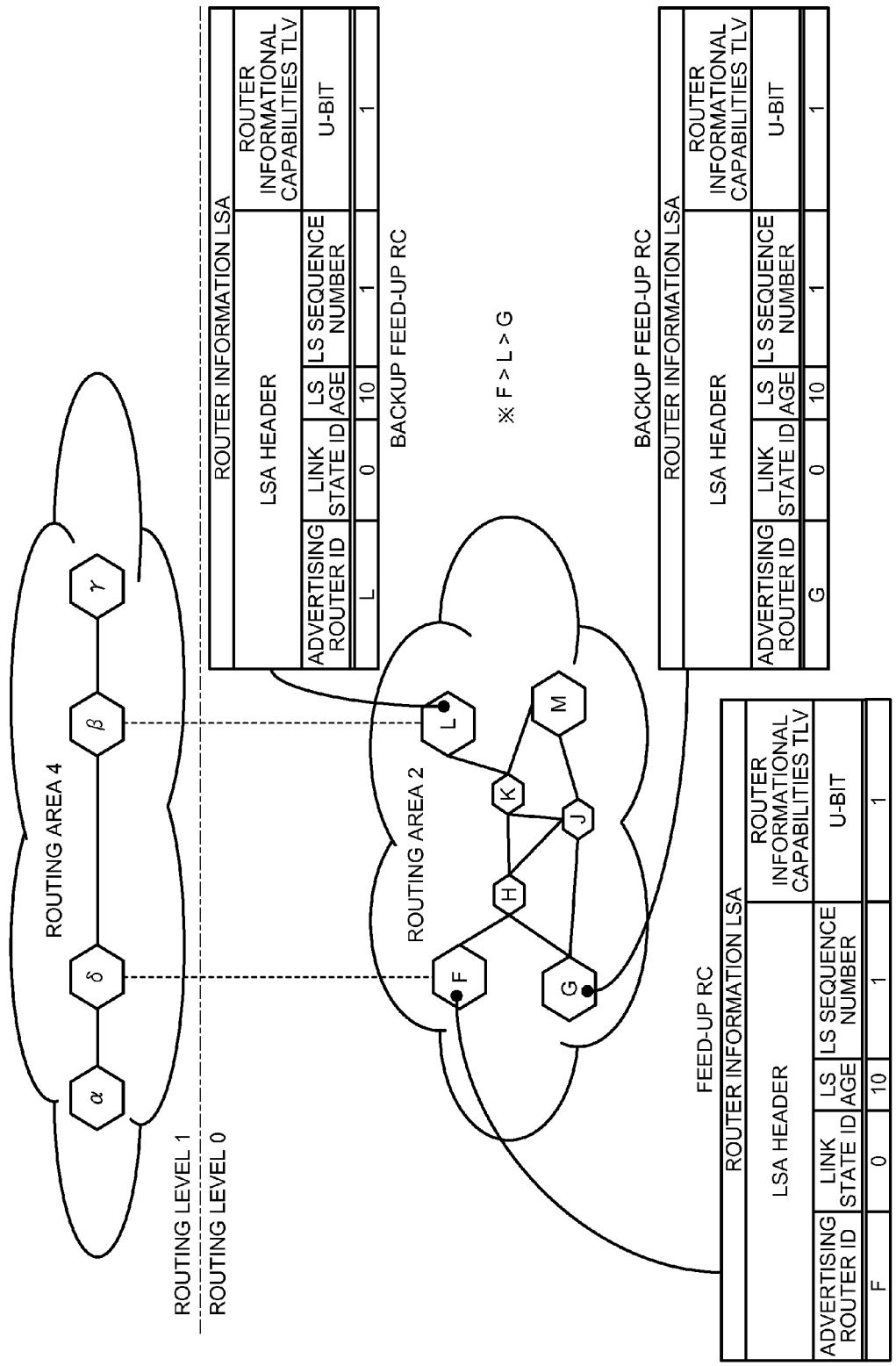
FIG. 8 is a schematic diagram for explaining selection of a feed-up routing controller (RC) and a backup feed-up RC according to the third embodiment.

As depicted in FIG. 8, each RC (the RC (F), the RC (G), and the RC (L)) capable of performing feed-up in the routing area 2 issues a router information LSA in which "U-bit=1" is given to "Router Informational Capabilities Type/Length/Value (TLV)" in the routing area 2.

The RCs (the RC (F), the RC (G), and the RC (L)) capable of performing feed-up in the routing area 2 then communicate information about the router information LSA with each other, and exchange the information about "U-bit=1" and the "Advertising Router IDs" of the respective RCs.

Subsequently, the RCs (the RC (F), the RC (G), and the RC (L)) capable of performing feed-up confirm the "Advertising Router ID" of each other, and select a main feed-up RC. In this example, an RC having the largest "Advertising Router ID" is selected as the main feed-up RC, and an RC having the second largest "Advertising Router ID" is selected as a backup feed-up RC. For example, according to FIG. 8, the large and small relation between the "Advertising Router IDs" is "F>L>G", so that the RC (F) is selected as the main feed-up RC, and the RC (L) is selected as the backup feed-up RC.

Flowchart of Feed-Up Process According to Third Embodiment

A flowchart of feed-up process performed by the system according to the third embodiment is explained below with reference to FIG. 9. FIG. 9 is a flowchart of a feed-up process performed by the system according to the third embodiment. It is assumed below that the RC (F) is the feed-up RC, and the RC (L) is the backup feed-up RC, both of which are selected with reference to FIG. 8.

Figure 9:
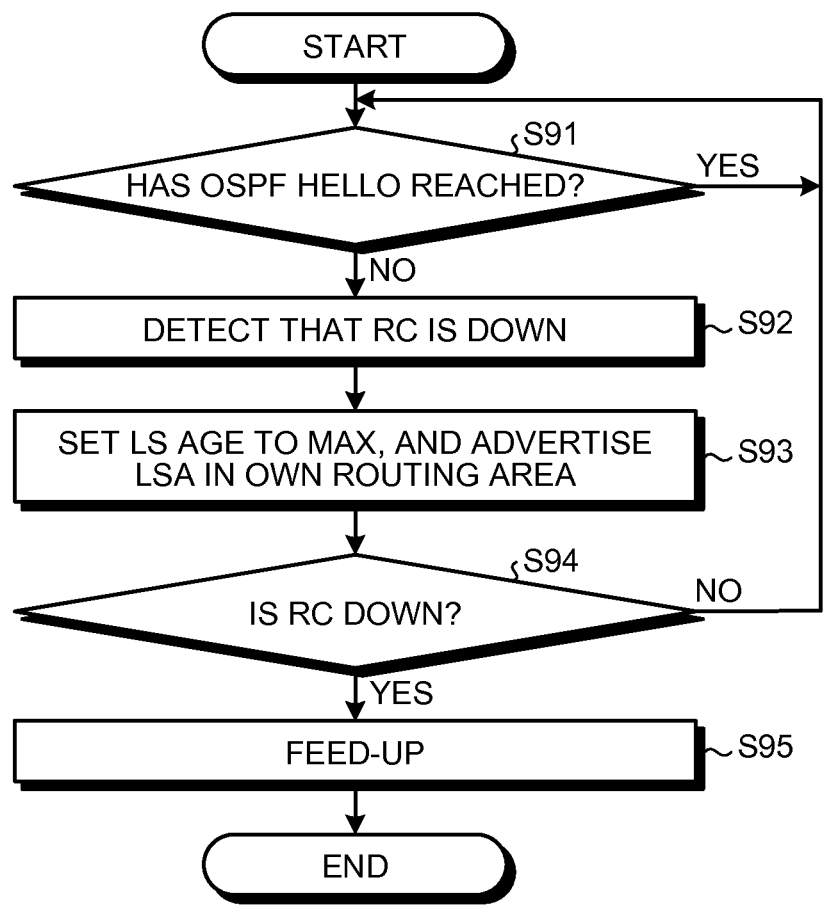
FIG. 9 is a flowchart of a feed-up process performed by a system according to the third embodiment.

As depicted in FIG. 9, when the main feed-up RC stalls its function, and exchange of link LSAs turns unavailable, "OSPF hello" does not reach an RC adjacent to the feed-up RC (No at Step S91); and then the adjacent RC detects a function stall of a node that is present in its own area and has the same function as its own (Step S92).

Specifically, when the RC (F) that is the main feed-up RC stalls its function and exchange of link LSAs turns unavailable, the RC (H) adjacent to the RC (F) becomes unable to receive "OSPF hello" from the RC (F). Because "OSPF hello" from the RC (F) does not reach, the RC (H) adjacent to the RC (F) then detects that the RC (F) that is the feed-up RC is down.

The RC adjacent to the feed-up RC then sets the "LS Age" of a link LSA to the feed-up RC to the maximum, and advertises the link LSA in the its own routing area (Step S93).

Specifically, the RC (H) adjacent to the RC (F) that is the feed-up RC sets the "LS Age" of a link LSA to the RC (F) to the maximum in accordance with processing of a usual OSPF, and advertises the link LSA in the routing area 2. Setting of the "LS Age" of a link LSA to the maximum is equivalent to an order to delete a link to the RC set to the maximum.

Subsequently, the backup feed-up RC determines that the feed-up RC is down based on the link LSA received from the RC adjacent to the feed-up RC (Step S94); when receiving, from the node that is present in its own area and has the same function as its own, a signal indicating deletion of link information about every link having the terminal point at the node or a signal of a request for the deletion, the backup feed-up RC detects a function stall of the node (Yes at Step S94); and then the backup feed-up RC collects link information of its own area indicating a network connection status in its own area in predetermined cycles as a backup node for the function-stalled node, and transmits the collected link information of its own area to another area assigned a different level from the level assigned to its own area (Step S95).

Specifically, when all of the "LS Ages" of link LSAs having terminal points at the RC (F) are set to MaxAge based on the link LSA received from the RC (H) adjacent to the RC (F) that is the feed-up RC, the RC (L) that is the backup feed-up RC determines that the RC (F) is down, and feeds up link information as a backup RC for the RC (F) similarly to the first embodiment.

Effects of Third Embodiment

In this way, according to the third embodiment, when a routing controller in the same area stalls its function due to a failure, the function stall is detected. Accordingly, redundancy of routing controllers that perform feed-up can be secured, and a failure-recovery can be promptly carried out.

For example, it is assumed that the feed-up RC (F), the RC (H) adjacent to the feed-up RC (F), and the backup feed-up RC (L) are placed in the routing area 2. Under such configuration, when the feed-up RC (F) stalls its function and exchange of link information turns unavailable, and when "OSPF hello" does not reach from the feed-up RC (F), the RC (H) adjacent to the feed-up RC (F) detects a function stall of the feed-up RC (F). The RC (H) then sets the "LS Age" of a link LSA from the RC (H) to the feed-up RC (F) to the maximum, and advertises the link LSA to the other RCs in the routing area 2. Subsequently, when all of the "LS Ages" of link LSAs having terminal points at the feed-up RC (F) are set to MaxAge, the backup feed-up RC (L) detects that the feed-up RC (F) stalls its function. The backup feed-up RC (L) starts the feed-up process as a backup RC for the feed-up RC (F) after the detection, accordingly, redundancy of routing controllers that perform feed-up and feed-down can be secured, and a failure-recovery can be promptly carried out.

[d] Fourth Embodiment

According to an embodiment of the present invention, when a routing controller detects a function stall of another routing controller that is present in the same routing area and has the same function, the routing controller can feed down link information. In other words, among the RC ($\delta$) and the RC ($\beta$), both of which are routing controllers belonging to the routing area 4, when a function stall of the RC ($\delta$) is detected, the RC ($\beta$) can immediately transmit link information of the routing area 4 to the RC (L) in the routing area 2.

Figure 10:
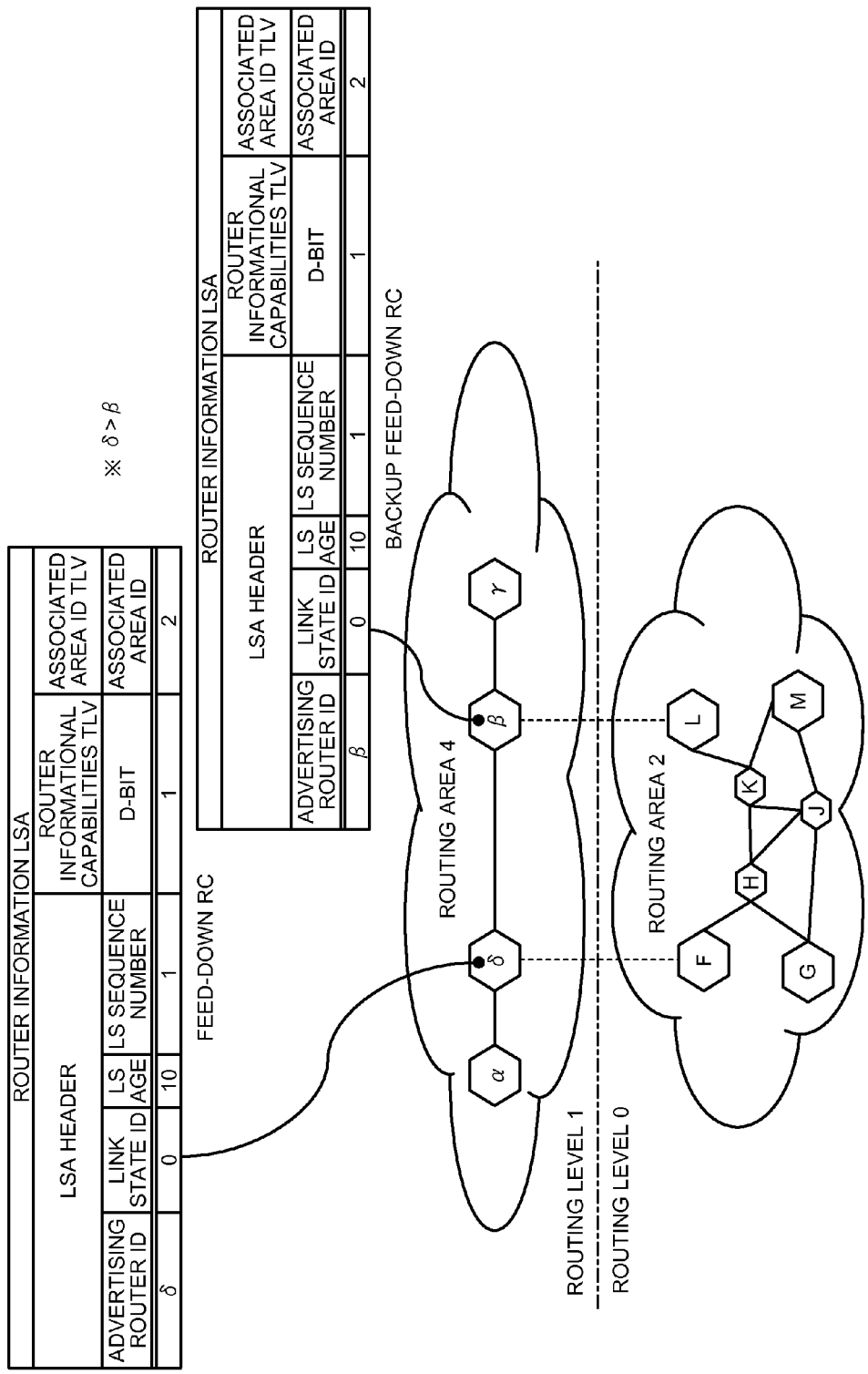
FIG. 10 is a schematic diagram for explaining selection of a feed-down RC and a backup feed-down RC according to a fourth embodiment of the present invention.

According to a fourth embodiment of the present invention described below, selection of a feed-down RC and a backup feed-down RC according to the fourth embodiment is explained with reference to FIG. 10; and feed-down process performed by a system according to the fourth embodiment is explained with reference to FIG. 11. A functional configuration and each processing of a communication apparatus according to the fourth embodiment are similar to those according to the third embodiment, therefore explanations of them are omitted.

Selection of Feed-Down RC and Backup Feed-Down RC According to Fourth Embodiment To begin with, selection of a feed-down RC and a backup feed-down RC according to the fourth embodiment is explained with reference to FIG. 10. FIG. 10 is a schematic diagram for explaining selection of a feed-down RC and a backup feed-down RC according to the fourth embodiment. The fourth embodiment is explained below in a case depicted in FIG. 6 where link information is transmitted from the routing area 4 on the routing level 1 to the routing area 2 on the routing level 0; however, the link information is similarly transmitted to each routing area, such as the routing area 1 and the routing area 3. The fourth embodiment is explained below by assuming that large and small relation between values of "Advertising Router IDs" (specifically, for example, IP address) indicating advertisers of link information is "$\delta>\beta$".

For example, each RC (the RC ($\delta$) and the RC ($\beta$)) capable of performing feed-down in the routing area 4 issues in the routing area 4 a router information LSA in which "D-bit=1"

is given to "Router Informational Capabilities TLV", and an "Associated Area ID" that specifies a feed-down destination is included.

The RCs (the RC (δ) and the RC (β)) capable of performing feed-down in the routing area 4 then communicate information of the router information LSA with each other, and exchange the "Associated Area IDs", "D-bit=1" and the "Advertising Router IDs".

After that, an RC having the "Associated Area ID=2" indicating that feed-down is to be performed toward the same routing area 2 and the largest "Advertising Router ID" is selected as a main feed-down RC, and an RC having the second largest "Advertising Router ID" is selected as a backup feed-down RC, from among the RCs with "D-bit=1". For example, according to FIG. 10, the large and small relation between the "Advertising Router IDs" is "δ>β", so that the RC (δ) is selected as the main feed-down RC, and the RC (β) is selected as the backup feed-down RC.

Flowchart of Feed-Down Process According to Fourth Embodiment

Figure 11:
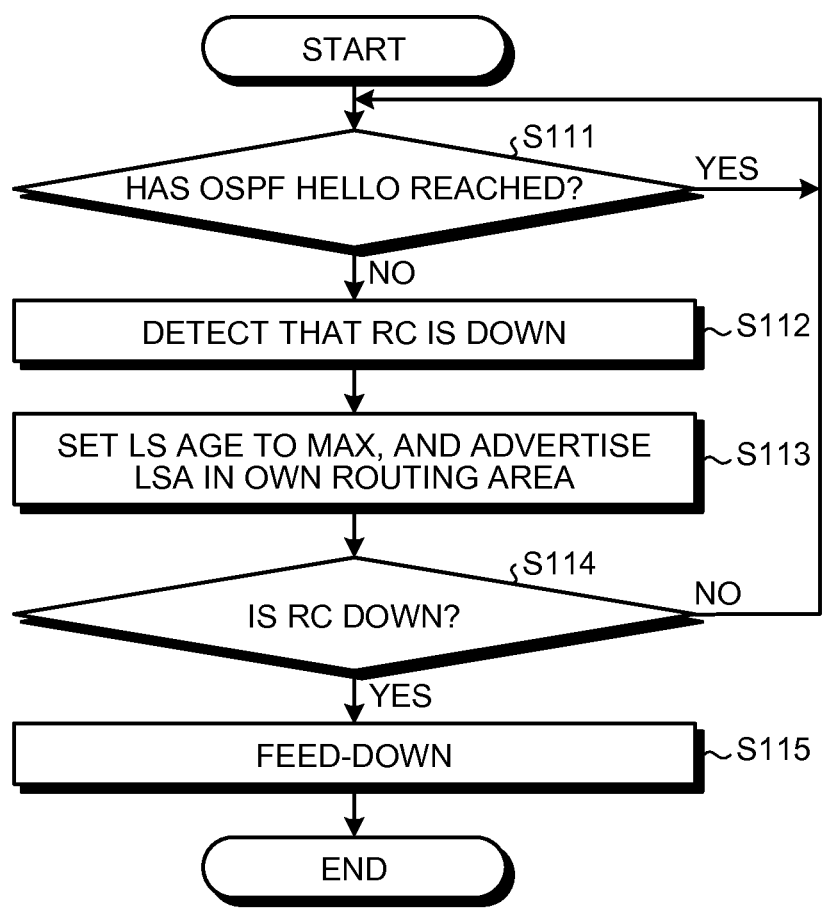
FIG. 11 is a flowchart of a feed-down process performed by a system according to the fourth embodiment.

With reference to FIG. 11, a feed-down process performed by the system according to the fourth embodiment is explained. FIG. 11 is a flowchart of the feed-down process performed by the system according to the fourth embodiment. With reference to FIG. 10, it is assumed below that the RC (δ) is selected as the feed-down RC, and the RC (β) is selected as the backup feed-down RC.

As depicted in FIG. 11, when the main feed-down RC stalls its function, and exchange of link LSAs turns unavailable, "OSPF hello" does not reach an RC adjacent to the feed-down RC (No at Step S111); and then the adjacent RC detects a function stall of a node that is present in its own area and has the same function as its own (Step S112).

Specifically, when the RC (δ) that is the main feed-down RC stalls its function and exchange of link LSAs turns unavailable in the routing area 4, the RC (α) adjacent to the RC (δ) becomes unable to receive "OSPF hello" from the RC (δ). Because "OSPF hello" from the RC (δ) does not reach, the RC (α) adjacent to the RC (δ) detects that the RC (δ) that is the feed-down RC is down.

The RC adjacent to the feed-down RC then sets the "LS Age" of a link LSA to the feed-down RC to the maximum, and advertises the link LSA in the its own routing area (Step S113).

Specifically, the RC (α) adjacent to the RC (δ) that is the feed-down RC sets the "LS Age" of a link LSA to the RC (δ) to the maximum in accordance with usual processing of OSPF, and advertises the link LSA in the routing area 4. Setting of the "LS Age" of a link LSA to the maximum is equivalent to an order to delete a link to the RC set to the maximum.

Subsequently, the backup feed-down RC determines that the feed-down RC is down based on the link LSA received from the RC adjacent to the feed-down RC (Step S114); when receiving, from the node that is present in its own area and has the same function as its own, a signal indicating deletion of link information about every link having the terminal point at the node or a signal of a request for the deletion, the backup feed-down RC detects a function stall of the node (Yes at Step S114); and then the backup feed-down RC collects link information of its own area indicating a network connection status in its own area in predetermined cycles as a backup node for the function-stalled node, and transmits the collected link information of its own area to another area assigned a different level from the level assigned to its own area (Step S115).

Specifically, when all of the "LS Ages" of link LSAs having terminal points at the RC (δ) are set to MaxAge based on the link LSA received from the RC (α) adjacent to the RC (δ) that is the feed-up RC, the RC (β) that is the backup feed-down RC determines that the RC (δ) is down, and feeds down link information as a backup RC for the RC (δ) similarly to the second embodiment.

Effects of Fourth Embodiment

In this way, according to the fourth embodiment, when a routing controller in the same area stalls its function due to a failure, the function stall is detected, accordingly, redundancy of routing controllers that perform feed-down can be secured, and a failure-recovery can be promptly carried out.

[e] Fifth Embodiment

Although the first to fourth embodiments are explained above in a case where when it is determined that link information received from another area assigned a different level is new link information, the new link information is stored in a predetermined storage unit, and the new link information is advertised in the own area; the present invention is not limited to this, and when it is determined that link information received from another area assigned a different level is new link information, while the new link information is stored in a predetermined storage unit, only predetermined link information can be extracted from the new link information, and advertised in the own area.

A fifth embodiment of the present invention is explained below in a case where when it is determined that link information received from another area assigned a different level is new link information, while the new link information is stored in a predetermined storage unit, only predetermined link information is extracted from the new link information and advertised in the own area. A functional configuration and each processing of a communication apparatus according to the fifth embodiment are similar to those according to the first embodiment or the third embodiment, therefore explanations of them are omitted.

Link-Information Extraction Process According to Fifth Embodiment

Figure 12:
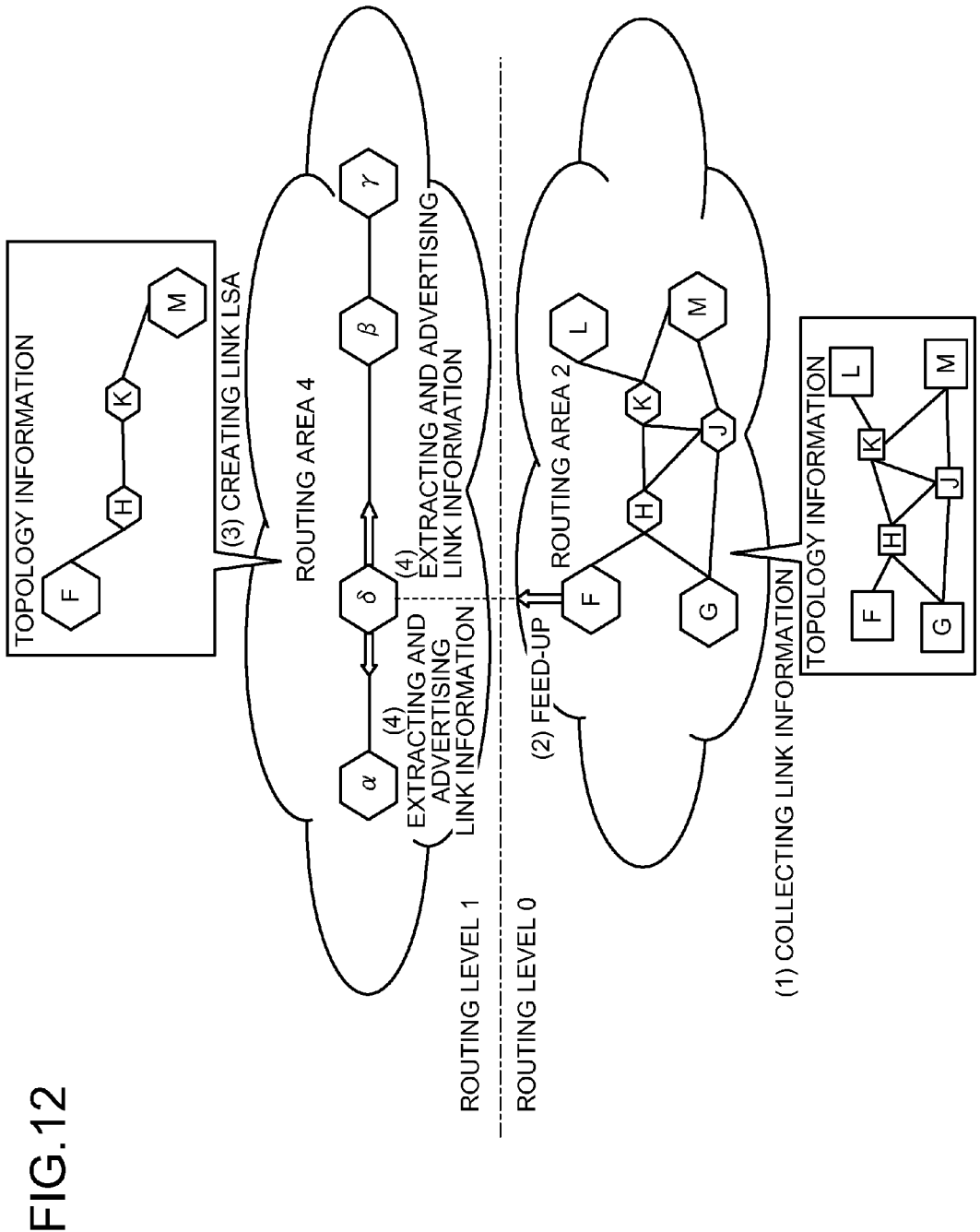
FIG. 12 is a schematic diagram for explaining a link-information extraction process according to a fifth embodiment of the present invention.

Link-information extraction process according to the fifth embodiment is explained below with reference to FIG. 12. FIG. 12 is a schematic diagram for explaining the link-information extraction process according to the fifth embodiment. The fifth embodiment is explained below in a case where link information is transmitted from the routing area 2 on the routing level 0 to the routing area 4 on the routing level 1; however, similar processing is performed by each routing area, such as the routing area 1 and the routing area 3.

As depicted in FIG. 12, the communication apparatus that stores therein overall link information collects link information of its own area that indicates a network connection status in its own area in predetermined cycles (see (1) FIG. 12). Specifically explaining, the RC (F) collects topology information that is link information indicating the network connection status in the routing area 2 on the routing level 0 every 30 minutes or when the link information is updated. For example, when the RC (Z) is newly connected to the RC (M) in the routing area 2 so that the network connection status is updated, the RC (F) collects link information of the routing area 2.

Subsequently, the communication apparatus transmits the collected link information of its own area to another area assigned a level different from the level assigned to its own area (see (2) in FIG. 12). Specifically explaining with reference to the example described above, the RC (F) converts the collected link information of the routing area 2 into the link LSA format, and feeds it up to the RC (δ).

The communication apparatus then receives link information from another area assigned a different level, and creates a link LSA indicating a network connected to an interface of the received link information by giving an identifier that uniquely identifies the received link information to the created link LSA (see (3) in FIG. 12).

Specifically explaining with reference to the example described above, the RC (δ) receives the link information of the routing area 2 transmitted from the RC (F), and creates a link LSA indicating a network connected to an interface of the received link information by directly giving the IDs described in the "Advertising Router ID" and the "LSA ID" of a link LSA of the received link information to the created link LSA.

After that, when receiving link information from another area assigned a different level, the communication apparatus determines whether the received link information is newer than stored link information. Specifically explaining with reference to the example described above, the RC (δ) determines whether the received link information is the newest link information based on the values of the "LS Age" and the "LS Sequence Number", by comparing a link LSA created from link information received from the RC (F), with a link LSA stored in the link-information storage unit 14a and circulating in the routing area 4.

Subsequently, when it is determined that the received link information is new link information, the communication apparatus stores the new link information in a predetermined storage unit, extracts only predetermined link information from the new link information, advertises the extracted link information in its own area; by contrast, when it is determined that received link information is not new link information, the communication apparatus discards the link information without storing and advertising the link information (see (4) in FIG. 12).

Specifically explaining with reference to the example described above, when it is determined that the received link information is the newest link information based on the values of the "LS Age" and the "LS Sequence Number" of a link LSA created from the received link information and a link LSA stored in the link-information storage unit 14a and circulating in the routing area 4, the RC (δ) stores the newest link information into the link-information storage unit 14a, and extracts only predetermined link information from the newest link information, and advertises the extracted link information to the RC (α) and the RC (β) in the routing area 4. By contrast, when it is that the link information is not the newest link information, the RC (δ) discards the link information without storing and advertising the link information.

For example, according to FIG. 12, the RC (δ) extracts link information about a link from the RC (F) to the RC (M) (except the RC (I)) as depicted in FIG. 12 as the predetermined link information. The RC (δ) then advertises the extracted link information to the RC (α) and the RC (β). The RC (δ) can extract, as the predetermined link information, the shortest route from the RC (F) to the RC (M) (except the RC (I)), or when link information is newly updated, the RC (δ) can extract only the updated link information.

Effects of Fifth Embodiment

In this way, according to the communication apparatus of the fifth embodiment, when it is determined that received link information is new link information, the new link information is stored in a predetermined storage unit, and only predetermined link information is extracted from the new link information and advertised in its own area; by contrast, when it is determined that the received link information is not new link information, the received link information is discarded without being stored and advertised; accordingly, a load onto the other nodes can be reduced in comparison with a load of exchanging all link information.

For example, the RC (δ) on the routing level 1 extracts only predetermined link information required for advertising link information (a link from the RC (F) to the RC (M) (except the RC (I)), and advertises only the extracted predetermined link information, accordingly, a load onto the other nodes can be reduced in comparison with a load of exchanging all link information.

[f] Sixth Embodiment

Although the embodiments according to the present invention are explained above, the present invention can be implemented in various different forms in addition to the embodiments described above. Different embodiments are explained below by dividing into two sections, (1) system configuration and (2) program.

(1) System Configuration

For example, the process procedures, the control procedures, the specific names, and information including various data and parameters depicted in the above description and the drawings (for example, FIG. 3 and FIG. 4) can be arbitrarily changed unless otherwise specified.

The components of each device illustrated in the drawings are conceptual for describing functions, and not necessarily be physically configured as illustrated in the drawings. In other words, specific forms of distribution and integration of the units are not limited to those illustrated in the drawings, and all or part of the units can be configured to be functionally or physically distributed and integrated by an arbitrary unit depending on various loads and conditions in use, for example, the link-information transmitting unit 15b and the link-information receiving unit 15c may be integrated into a link-information transmitting-receiving unit. All or part of each processing function performed by each unit can be implemented by a Central Processing Unit (CPU) and a computer program to be analyzed and executed by the CPU, or can be implemented as hardware by wired logic.

(2) Program

Figure 13:
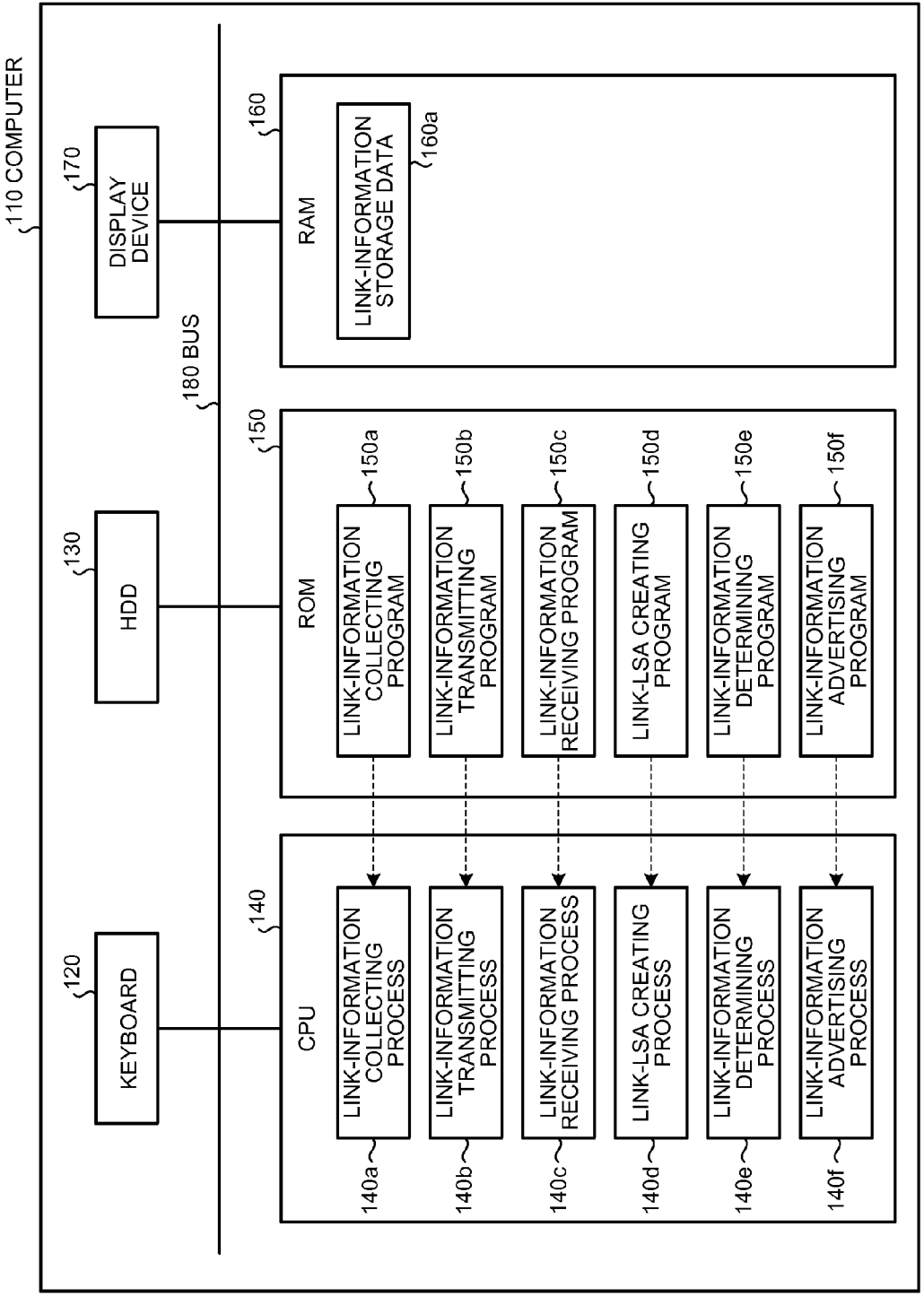
FIG. 13 is a schematic diagram of a computer that executes a communication program.

The communication apparatus explained in the embodiments can be implemented by executing a previously prepared computer program with a computer, such as a personal computer or a workstation. An example of a computer that executes a communication program that have functions similar to those of the communication apparatus described in the above embodiments is explained below with reference to FIG. 13. FIG. 13 is a schematic diagram of a computer that executes a communication program.

As depicted in FIG. 13, a computer 110 as the communication apparatus includes a keyboard 120, a Hard Disk Drive (HDD) 130, a CPU 140, a Read-Only Memory (ROM) 150, a Random Access Memory (RAM) 160, and a display device 170, all of which are connected with a bus 180.

The ROM 150 preliminarily stores therein communication program that perform functions similar to those of the communication apparatus 10 described above in the first embodiment, namely, a link-information collecting program 150a, a link-information transmitting program 150b, a link-information receiving program 150c, a link-LSA creating program 150d, a link-information determining program 150e, and a link-information advertising program 150f, as depicted in FIG. 13. The programs 150a to 150f can be integrated or distributed as required, similarly to the respective components of the communication apparatus depicted in FIG. 2.

As the CPU 140 reads the programs 150a to 150f from the ROM 150 and executes them, the communication programs 150a to 150f function as a link-information collecting process 140a, a link-information transmitting process 140b, a link-information receiving process 140c, a link-LSA creating process 140d, a link-information determining process 140e, and a link-information advertising process 140f, respectively, as depicted in FIG. 13. The processes 140a to 140f correspond to the link-information collecting unit 15a, the link-information transmitting unit 15b, the link-information receiving unit 15c, the link-LSA creating unit 15d, the link-information determining unit 15e, and the link-information advertising unit 15f, depicted in FIG. 2, respectively.

The CPU 140 executes the communication program based on link-information storage data 160a stored in the RAM 160.

The programs 150a to 150f are not necessarily initially stored in the ROM 150, and each of the programs can be stored in a "portable physical medium" configured to be inserted into the computer 110, such as a Flexible Disk (FD), a Compact Disk Read Only Memory (CD-ROM), a Digital Versatile Disk (DVD), an optical disk, and an integrated circuit (IC) card, or a "fixed physical medium" provided inside or outside the computer 110, such as an HDD, or furthermore, "another computer (or a server)" configured to be connected to the computer 110 via a public circuit, the Internet, a local area network (LAN), and/or a wide area network (WAN), and the computer 110 can be configured to read the programs from them and to execute the programs.

According to an embodiment of the present invention, the communication apparatus can carry out a prompt failure-recovery by securing redundancy of routing controllers that perform feed-up or feed-down, can avoid overlap of link information coming up with feed-up or feed-down, can maintain accuracy of the link information, and can maintain interconnections without providing extension, such as an addition of a field that identifies a generator of link information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus for controlling communication between an own area, to which the communication apparatus belongs and to which a level is assigned, and another area, to which a different level from the level of the own area is assigned, in a hierarchical network including areas to which levels are assigned, the communication apparatus comprising:
    a function-stall detecting unit that detects a function stall of a representative node of the own area when receiving a link LSA (Link-State Advertisement) which has a terminal point at the representative node and in which a predetermined value is set, the representative node transmitting link information of the own area to another area as a representative of the own area;
    a link-information storage unit that stores therein link information indicating a network connection status across the hierarchical network;
    a link-information transmitting unit that, when the function-stall detecting unit detects a function stall of the representative node, collects link information of the own area in certain cycles as a backup node for the representative node in the function stall, and transmits collected link information of the own area indicating a network connection status in the own area to another area assigned a different level from the level assigned to the own area;
    a link-information determining unit that determines, when receiving link information from another area assigned a different level, whether received link information is new link information that is newer than link information stored by the link-information storage unit; and
    a link-information advertising unit that stores new link information into the link-information storage unit and advertises the new link information in the own area when the link-information determining unit determines that the received link information is the new link-information, and discards the received link information without storing and advertising the received link information, when the link-information determining unit determines that the received link information is not the new link-information.

2. The communication apparatus according to claim 1, wherein
    when receiving link information from an inside of the own area, the link-information determining unit determines whether received link information is new link information that is newer than link-information stored by the link-information storage unit,
    when the link-information determining unit determines that the received link information is new link information, the link-information transmitting unit stores the new link information in the link-information storage unit and transmits the new link information to another area on a lower level than the level of the own area, and
    when the link-information determining unit determines that the received link information is not new link information, the link-information transmitting unit discards the received link information without storing and transmitting the received link information.

3. The communication apparatus according to claim 1, wherein
    when the link-information determining unit determines that received link information is new link-information, the link-information advertising unit stores the new link information in the link-information storage unit, and advertises a predetermined portion of the new link information in the own area, and
    when the link-information determining unit determines that received link information is not new link-information, the link-information advertising unit discards the received link information without storing and advertising the received link information.

4. A non-transitory computer readable storage medium having stored therein a program for controlling communication between an own area, to which a communication apparatus belongs and to which a level is assigned, and another area, to which a different level from the level of the own area is assigned, in a hierarchical network including areas to which levels are assigned, the program causing a computer to execute a process comprising:
    detecting a function stall of a representative node of the own area when receiving a link LSA (Link-State Advertisement) which has a terminal point at the representative node and in which a predetermined value is set, the representative node transmitting link information of the own area to another area as a representative of the own area;
    storing link information indicating a network connection status across the hierarchical network;

collecting, when the function-stall detecting unit detects a function stall of the representative node, link information of the own area in certain cycles as a backup node for the representative node in the function stall, and transmitting collected link information of the own area indicating a network connection status in the own area to another area assigned a different level from the level assigned to the own area;

determining, when link information is received from another area assigned a different level, whether received link information is new link information that is newer than link information stored in the storing; and storing new link information into the link-information storage unit and advertising the new link information in the own area when it is determined that the received link information is the new link-information, and discarding the received link information without storing and advertising the received link information, when it is determined that the received link information is not the new link-information.

* * * * *